Dec. 2, 1952 P. N. ERICKSON 2,620,105
SPARE WHEEL MOUNTING FOR VEHICLES
Filed May 1, 1950
FIG.I.
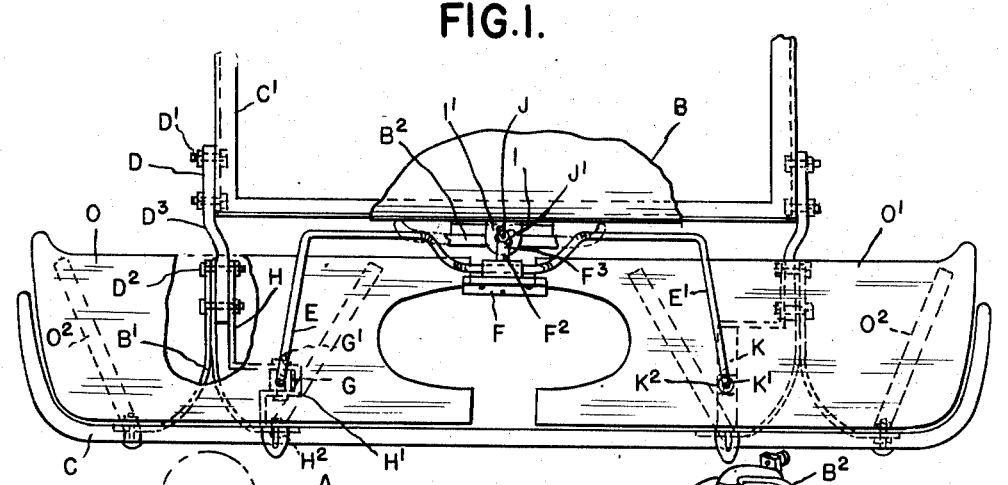
FIG.3.
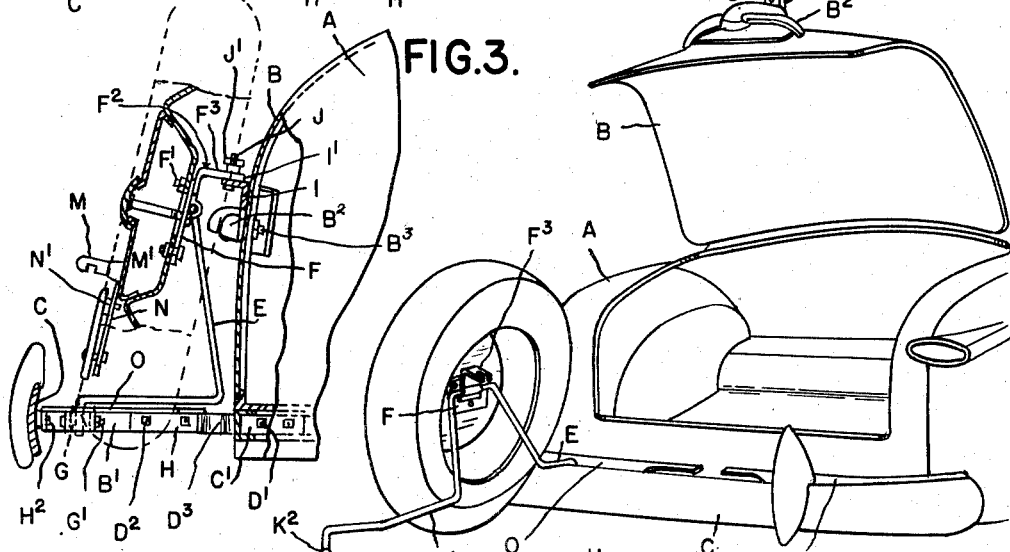
FIG.2.
FIG.4.
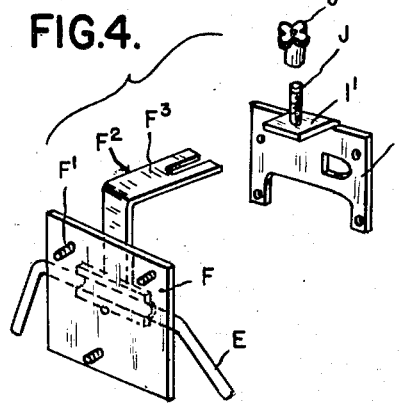
FIG.5.
INVENTOR.
PAUL N. ERICKSON
BY
Whittemore Hulbert + Belknap
ATTORNEYS Patented Dec. 2, 1952

2,620,105

UNITED STATES PATENT OFFICE 2,620,105

SPARE WHEEL MOUNTING FOR VEHICLES

Paul N. Erickson, Detroit, Mich.

Application May 1, 1950, Serial No. 159,312

3 Claims. (Cl. 224—42.06)

The invention relates to spare wheel mountings on vehicles and has for its object the obtaining of a construction which holds the wheel in a conveniently accessible position, and which does not occupy valuable storage space in the vehicle body or interfere with access thereto.

Spare wheels and spare-tired rims have been mounted in various locations on the vehicle, such as at the side or at the rear. However, with the advent of the closed body car having the luggage compartment in the rear portion thereof, and the doing away with the running boards, it has been the usual practice to place the spare wheel within the storage compartment. This not only occupies valuable space which might otherwise be used for luggage, but also often requires the unpacking of the load to obtain access to the spare wheel.

It is the object of the invention to obtain a construction of spare wheel mounting which is located in an accessible position at the rear of the car body, but which does not interfere with free access to the luggage compartment.

To this end the invention consists in a spare wheel carrier pivotally mounted on the vehicle frame so as to be normally positioned in rear of the body portion containing the luggage compartment but capable of being swung out of the path to said compartment.

The invention further consists in a construction of spare wheel mounting which may be applied to vehicles not designed to receive it and without necessitating expensive changes therein.

The invention further consists in the more specific construction as hereinafter set forth.

In the drawings:

Fig. 1 is a plan view of the rear portion of a vehicle including the rear bumper and showing my improved wheel mounting applied thereto but with the wheel removed;

Fig. 2 is a perspective view of the rear portion of the vehicle with the lid of the luggage compartment in raised position and showing the wheel mounting swung to the side for access to said compartment;

Fig. 3 is a vertical longitudinal section through the wheel mounting;

Fig. 4 is a perspective view of the detached members which are used for forming the tie connection; and Fig. 5 is a perspective view of the detached swivel mounting for the arm.

A is the rear portion of an automobile body, B is the lid or closure for the luggage compartment therein, and C is the bumper in rear of the body. If the car is designed to carry the spare wheel in the storage compartment, the rear bumper is usually located quite close to the body but is mounted on the chassis frame by brackets extending rearward from the opposite side walls thereof. My improved wheel mounting can be applied to such a car construction, but it is necessary to first shift the bumper further to the rear so as to provide the necessary space for receiving the mounting between the bumper and the body. As shown in Fig. 1 the rear bumper C is provided with Y-shaped bracket members B', which originally were directly bolted to the side sills C' of the vehicle frame. To shift the bumper the brackets are first detached from the side sills and extension members D are placed between the bumper and said sills. These extensions may be secured to the sills by the same bolts D' first used for the Y-shaped brackets, and additional bolts $D^2$ secure the brackets to the forward end portions of the extensions. The extension members are metal bars bent at $D^3$ to offset the rear portions into proper alignment with the brackets.

The wheel mounting comprises essentially an arm E pivotally attached to the vehicle frame at one side thereof and extending upward and towards the center of the body where it is provided with a mounting plate F. The latter is welded, or otherwise secured, to the arm and has a series of threaded studs F' projecting rearward therefrom and located to engage the stud receiving apertures in the wheel body. Thus the mounted wheel may be swung with the arm around its pivotal connection to extend rearward at one side where it will not interfere with access to the luggage compartment. Normally the wheel is rigidly held in position by a brace which attaches the plate F to the vehicle body. More in detail, the arm E may be formed of a rod of rounded cross section having a vertically extending end portion engaging a swivel bearing on the frame. Preferably this end of the rod is threaded to engage a threaded aperture in a bearing block G, which latter is secured to a bracket member H extending between one of the members D and the bumper and having a U-shaped portion H' for embracing the block G. The inner end of the bracket H may be secured by the same bolts D' which attach the Y-shaped bracket B' to the extension member D. The outer end of the bracket H is attached to the bumper by a bolt $H^2$, which is also used for securing the vertical guard C' of the bumper to the horizontal portion thereof. The block G is secured within the U of the bracket by a bolt G'. The tie connection between the mounting plate F and the body is formed by an angle bracket $F^2$, one arm of which is welded to the plate while the other arm extends rearward therefrom. The lid or closure plate B for the storage compartment of the vehicle body is usually provided with a handle member B², which member is bolted to a vertically extending portion of the lid. Making use of this construction I provide an angle member I, one flange of which is inserted between the handle member B² and the lid and is clamped thereto by the same bolts B³ which normally secured the handle. The outwardly extending portion I' of the angle member I will be adjacent to the rearwardly extending portion F³ of the angle bracket F². These parts are detachably secured to each other by a screw threaded pin J extending upward from I' and having a handled nut J' engaged therewith. The screw J enters a slot in the rear end of the arm F³ and the nut J' engages a socket in the upper face of said member. Thus when the nut is tightened it will clamp the arm F³ to the arm I' and form a rigid connection between the lid B and the plate F. This will hold the wheel and its mounting stationary between the body and rear bumper when the car is in operation, but whenever it is desired to open the luggage compartment the nut J' is loosened, the portion F³ detached from the portion I' and the arm E swung rearward and to one side.

While the construction as above described will hold the spare wheel mounting stationary during operation of the car, additional stability is provided by a brace member E'. This is formed by an extension of the arm E beyond the plate to the right Fig. 1 and downward to have its end portion supported on the frame. The support is formed by a bracket member K somewhat similar to the bracket H extending between the other of the extension members D and the bumper and secured in the same manner as the member H. However, the bracket K is formed with the socket K' into which a vertical end portion of the brace member E' is inserted, said portion being provided with a rubber tip K² to form a cushion support. Thus both of the portions E and E' sustain the load of the wheel carrier.

The placing of the spare wheel mounting in rear of the body obscures the license plate and tail light as these members are usually mounted on the car. I have therefore provided a substitute tail lamp and license plate mounting which is normally located in rear of the spare wheel. Such construction comprises an extra wheel cap L such as placed on the wheels which are in operation, said extra cap being mounted on the spare wheel but being sprung into engagement therewith. Secured to this cap is a tail light M, the base portion M' of which is clamped to the lower portion of the cap and has a downwardly extending arm N with a cross arm N' forming the license plate mounting. The service conductor which supplies current to the regular tail light can be detached therefrom and engaged with the substitute lamp by a plug connection which permits of detachment when the wheel mounting is to be swung outward. As soon as the mounting is returned to normal position, the plug will be again connected so as to supply current to the lamp whenever the controlling switch is operated.

As the shifting of the bumper to the rear opens a fairly wide space between the same and the body, I preferably provide splash aprons O, O' to cover this space. These are secured to bracket arms O² which may be secured to the bumper by the same bolts that attach said bumper to the Y-brackets B.

The application of the wheel mounting to a car not originally designed for its use does not require any alteration in the latter which would preclude restoring it to its original condition. Thus no additional holes are drilled either in the frame or any portion of the regular car construction and all the additional parts can be removed and the bumper replaced in its original position any time that the owner desires to do this. The construction is therefore particularly useful for use on a car when touring to give additional storage space for baggage. When this space is not required the car may be restored to its original condition.

What I claim as my invention is:

1. A spare wheel mounting for vehicles having a frame including side sills, a body on said frame provided with a storage compartment in the rear portion thereof and a closure lid for the opening into said compartment, a rear bumper and brackets for securing said bumper to the side sills of said frame and only slightly in rear of said body; comprising extension members interposed between and secured to said bumper brackets and side sills shifting said bumper rearward, a member secured by the securing means of said bracket to said extension member and bumper, swivel bearing mounted on the latter member, an arm having a vertical portion engaging said swivel bearing, and a portion extending therefrom upward and towards the center line of said body, a plate mounted on the upper portion of said arm forming a seat for a spare wheel and provided with clamping means for securing the body of said wheel to said seat, said wheel when so mounted being located between said bumper and body in rear of the latter, and a brace rigidly connecting said plate to said closure lid, said brace being disengageable to permit swinging of the wheel rearward and to one side of the frame to provide access to said storage compartment.

2. The construction as in claim 1 in which the member on which said swivel bearing is mounted is a bar having a central U-shaped bend therein embracing and secured to said bearing, the opposite end portions of said bar being secured as aforesaid to said extension member and bumper.

3. The construction as in claim 2 in which the upwardly extending portion of said arm is inverted U-shape and is extended to form an additional support for said wheel, and a member similar to said swivel bearing mounted member similarly secured to the other bumper securing member and with which the extension of said inverted U-shaped arm is detachably engaged.

PAUL N. ERICKSON.

REFERENCES CITED

The following references are of record in the file of this patent:

UNITED STATES PATENTS

| Number | Name | Date |
|---|---|---|
| 1,419,965 | Gerrie | June 20, 1922 |
| 1,519,894 | Adams | Dec. 16, 1924 |
| 1,542,107 | Sutherland | June 16, 1925 |
| 1,575,685 | Herrmann | Mar. 9, 1926 |
| 1,601,937 | Burd | Oct. 5, 1926 |
| 1,689,148 | McCloud | Oct. 23, 1928 |
| 1,715,719 | Shelton | June 4, 1929 |
| 1,808,983 | Hebeler | June 9, 1931 |
| 1,953,858 | Kessler | Apr. 3, 1934 |